(12) United States Patent
Choi et al.

(10) Patent No.: US 9,046,164 B2
(45) Date of Patent: Jun. 2, 2015

(54) SHIFT LEVER FOR A VEHICLE TRANSMISSION

(71) Applicants: Hyundai Motor Company, Seoul (KR); Kia Motors Corporation, Seoul (KR)

(72) Inventors: Jee Hyuck Choi, Seongnam-si (KR); Eun Sik Kim, Daegu (KR); Jeong Seon Min, Hwaseong-si (KR); Hee Soo Yang, Hwaseong-si (KR); Bum Jun Kim, Bucheon-si (KR); Yang Rae Cho, Hwaseong-si (KR); Dong Sik Jeong, Daegu (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 13/932,596

(22) Filed: Jul. 1, 2013

(65) Prior Publication Data
US 2014/0116176 A1    May 1, 2014

(30) Foreign Application Priority Data

Oct. 26, 2012 (KR) .......................... 10-2012-0120004

(51) Int. Cl.
    *F16H 59/10*      (2006.01)
    *F16H 59/02*      (2006.01)

(52) U.S. Cl.
    CPC ....... *F16H 59/0278* (2013.01); *Y10T 74/20098* (2015.01); *F16H 59/10* (2013.01); *F16H 2059/0282* (2013.01)

(58) Field of Classification Search
    CPC ..................................................... F16H 59/10
    USPC ............... 74/473.21, 473.24, 473.25, 473.26, 74/473.3, 523
See application file for complete search history.

(56) References Cited

U.S. PATENT DOCUMENTS

| | | | | |
|---|---|---|---|---|
| 3,998,109 A | * | 12/1976 | O'Brien ..................... | 74/473.23 |
| 4,078,447 A | * | 3/1978 | Kato et al. ................ | 74/473.23 |
| 4,513,276 A | * | 4/1985 | Kubota et al. ............. | 200/61.88 |
| 4,565,151 A | * | 1/1986 | Buma ......................... | 116/28.1 |
| 4,909,096 A | * | 3/1990 | Kobayashi .................. | 74/538 |
| 5,015,807 A | * | 5/1991 | Ishizuki et al. ............ | 200/61.88 |
| 5,179,870 A | * | 1/1993 | Behrens et al. ............. | 74/473.3 |
| 5,187,999 A | * | 2/1993 | Kobayashi et al. ......... | 74/528 |
| 5,207,740 A | * | 5/1993 | Ikushima et al. .......... | 192/220.6 |
| 5,345,836 A | * | 9/1994 | Yokoyama et al. ........ | 74/473.23 |

(Continued)

FOREIGN PATENT DOCUMENTS

JP    H04-107564    9/1992
KR    10-1997-0027758    6/1997

(Continued)

*Primary Examiner* — Justin Krause
*Assistant Examiner* — Gregory Prather
(74) *Attorney, Agent, or Firm* — McDermott Will & Emery LLP

(57) ABSTRACT

Disclosed is a shift lever for a vehicle transmission, which includes a rod provided in a mounting space to move linearly and having an upper part having an upper inclined surface and successive engaging grooves. An engaging protrusion is provided on an inner wall of a support section such that, when the rod moves, the engaging protrusion is engaged with one of the engaging grooves to afford a brisk, clear operation action when changing gears. A button is provided such that one end thereof extends to the inclined surface of the upper part of the rod, and another end thereof is exposed to the outside to enable that end to be pressed down to push the rod down.

7 Claims, 7 Drawing Sheets

(56) References Cited

U.S. PATENT DOCUMENTS

| | | | | |
|---|---|---|---|---|
| 5,402,870 | A * | 4/1995 | Osborn | 192/220.7 |
| 5,458,017 | A * | 10/1995 | Kanematsu et al. | 74/473.23 |
| 5,494,141 | A * | 2/1996 | Osborn et al. | 192/220.4 |
| 5,540,180 | A * | 7/1996 | Kataumi et al. | 116/28.1 |
| 5,575,174 | A * | 11/1996 | Kanematsu et al. | 74/473.23 |
| 5,575,175 | A * | 11/1996 | Kataumi et al. | 74/473.28 |
| 5,577,418 | A * | 11/1996 | Traxler et al. | 74/528 |
| 5,582,073 | A * | 12/1996 | Takeuchi et al. | 74/473.23 |
| 5,617,760 | A * | 4/1997 | Woeste et al. | 74/473.23 |
| 5,677,658 | A * | 10/1997 | Osborn et al. | 335/228 |
| 5,718,312 | A * | 2/1998 | Osborn et al. | 192/220.4 |
| 5,759,132 | A * | 6/1998 | Osborn et al. | 477/96 |
| 5,765,413 | A * | 6/1998 | Jung | 70/201 |
| 5,938,562 | A * | 8/1999 | Withey | 477/96 |
| 6,186,263 | B1 * | 2/2001 | Takano | 180/336 |
| 6,189,398 | B1 * | 2/2001 | Kataumi et al. | 74/423 |
| 6,298,743 | B1 * | 10/2001 | Horn et al. | 74/473.3 |
| 6,301,994 | B1 * | 10/2001 | Syamoto | 74/538 |
| 6,339,968 | B1 * | 1/2002 | Nagashima | 74/473.25 |
| 6,374,978 | B1 * | 4/2002 | Spencer | 192/220.3 |
| 6,422,106 | B1 * | 7/2002 | Lee | 74/473.18 |
| 6,435,052 | B1 * | 8/2002 | Ersoy et al. | 74/473.1 |
| 6,487,883 | B2 * | 12/2002 | Suzuki et al. | 70/247 |
| 6,915,718 | B2 * | 7/2005 | Blascok et al. | 74/538 |
| RE39,598 | E * | 5/2007 | Markyvech | 74/335 |
| 7,360,469 | B2 * | 4/2008 | Tomida | 74/537 |
| 7,430,940 | B2 * | 10/2008 | Kondou et al. | 74/537 |
| 7,654,169 | B2 * | 2/2010 | Sumi et al. | 74/473.3 |
| 7,913,583 | B2 * | 3/2011 | Reppuhn et al. | 74/473.24 |
| 8,539,852 | B2 * | 9/2013 | Yamamura | 74/473.35 |
| 8,590,414 | B2 * | 11/2013 | Cho et al. | 74/473.29 |
| 2002/0144567 | A1 * | 10/2002 | Lee | 74/523 |
| 2005/0022622 | A1 * | 2/2005 | Mitteer | 74/473.3 |
| 2005/0223834 | A1 * | 10/2005 | Otsuka | 74/473.18 |
| 2006/0032723 | A1 * | 2/2006 | Wilber | 192/220.4 |
| 2006/0060019 | A1 * | 3/2006 | Sato et al. | 74/473.23 |
| 2008/0022805 | A1 * | 1/2008 | Howe et al. | 74/527 |
| 2008/0034913 | A1 * | 2/2008 | Takikawa | 74/473.33 |
| 2008/0178645 | A1 * | 7/2008 | Howe et al. | 70/201 |
| 2011/0023646 | A1 * | 2/2011 | Hanjono et al. | 74/473.3 |
| 2011/0277578 | A1 * | 11/2011 | McGuire et al. | 74/473.3 |
| 2013/0298712 | A1 * | 11/2013 | Moon et al. | 74/473.3 |
| 2014/0123798 | A1 * | 5/2014 | Miyamoto et al. | 74/473.3 |
| 2014/0137684 | A1 * | 5/2014 | Ujimoto et al. | 74/473.23 |
| 2014/0137697 | A1 * | 5/2014 | Ujimoto et al. | 74/523 |

FOREIGN PATENT DOCUMENTS

| | | |
|---|---|---|
| KR | 10-2004-0024200 A | 3/2004 |
| KR | 10-2004-0040916 A | 5/2004 |
| KR | 10-2006-0110210 A | 10/2006 |
| KR | 10-0878083 B1 | 1/2009 |

* cited by examiner

SHIFT LEVER FOR A VEHICLE TRANSMISSION

CROSS-REFERENCE TO RELATED APPLICATION

This application is based on and claims priority from Korean Patent Application No. 10-2012-0120004, filed on Oct. 26, 2012 in the Korean Intellectual Property Office, the disclosure of which is incorporated herein in its entirety by reference.

BACKGROUND

1. Field

The present disclosure relates, in general, to a shift lever for a vehicle transmission which, when operated by a driver to change gear steps, facilitates a smooth changing operation.

2. Background

Generally, drivers manually operate a shift lever provided in a vehicle to select a desired operation mode of the shift lever in order to change gear steps of a vehicle transmission. Particularly in an automatic transmission, drivers manually operate the shift lever to set the operation mode such as forward mode, neutral mode, backward mode, engine brake mode, and parking mode. Here, particularly when it is intended to select the backward mode, the gear change can generally be done only when a button, i.e., a kind of safety device, is pressed down.

As shown in FIG. 1, when the driver presses the button 500 down, an end side of the button rolls along an inclined surface 330 of a head 310 to move a rod 300 up and down. Here, this action causes operation noise and unsmooth operation to occur due to friction between the button 500 and the head 310 and between the head 310 and wall parts of an internal mounting space 210 of a support section 200, causing a feeling of inconvenience to the driver.

Further, in the case where the button is operated by a spring force as disclosed in Korean Patent laid-open Publication No. 10-1997-0027758 A, when the button is operated, the driver feels dull because the button is simply moved in a vertical direction with increased operation force by the repulsive action of a spring.

The description regarding the related art is provided only for understanding of the background of the disclosure, so it should not be construed by ordinary persons skilled in the art to admit it to belong to the related art.

SUMMARY

Accordingly, the present disclosure has been made keeping in mind the above problems occurring in the related art, and the present disclosure is intended to propose a shift lever which minimizes operation noise and friction when operating a button to reduce the feeling of inconvenience to a driver and to facilitate smooth operation of the button.

In order to achieve the above object, according to one aspect of the present disclosure, there is provided a shift lever for a vehicle transmission including a knob; a support section provided under the knob and having an internal mounting space aligned in a first direction; a rod provided in the mounting space of the support section to move linearly in the first direction and having an upper part having an upper inclined surface inclined at a certain angle with respect to the first direction and a side having a plurality of successive engaging grooves aligned in the first direction; an engaging protrusion provided on an inner wall surrounding the mounting space of the support section at a position corresponding to one of the engaging grooves such that, when the rod moves linearly in the first direction, the engaging protrusion is configured to successively and selectively engage with one of the engaging grooves so as to afford a brisk, clear operation action when changing gears; an elastic part mounted at a lower side of the rod to support the rod in the first direction; and a button provided on one side of the knob such that one end thereof extends inside the knob to the inclined surface of the upper part of the rod, and another end thereof is exposed to the outside of the knob to enable that end to be pressed down so as to push the rod down.

The button may be provided on one side with a roller which, when the button is pressed down, the button is configured to push down the rod while rolling along the inclined surface of the rod.

The button may be provided on one side with a roller including a central shaft, a first member made of a hard material surrounding the central shaft, and a second member made of a soft material surrounding the first member.

The first member may have a circumferential protrusion configured to increase an engaging force with respect to the second member.

The engaging protrusion may be provided in an opening of the inner wall of the mounting space of the support section and is surrounded by side and upper gaps in the opening, such that the engaging protrusion is configured to elastically move back and forth.

A head may be assembled onto the upper part of the rod, the head having an inclined surface on its upper portion and a plurality of vertically successive engaging grooves on its one side.

The inclined surface may have a slope inclined at a gently variable angle.

According to the configuration of the shift lever of the present disclosure, a button is provided with a roller at an inner part thereof which comes into contact with a surface of a head, such that the roller rolls along the surface, thereby reducing the friction between the button and the surface and facilitating smooth operation of the button.

Further, engaging grooves are formed on one side of a head opposite an inclined surface of the head, and an elastically movable engaging protrusion is formed on an inner wall of a mounting space of a support section, so that, when a rod moves linearly in the first direction, one of the engaging grooves and the engaging protrusion are engaged with each other with a brisk, clear operation action.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION OF THE DISCLOSURE

Figure 1:
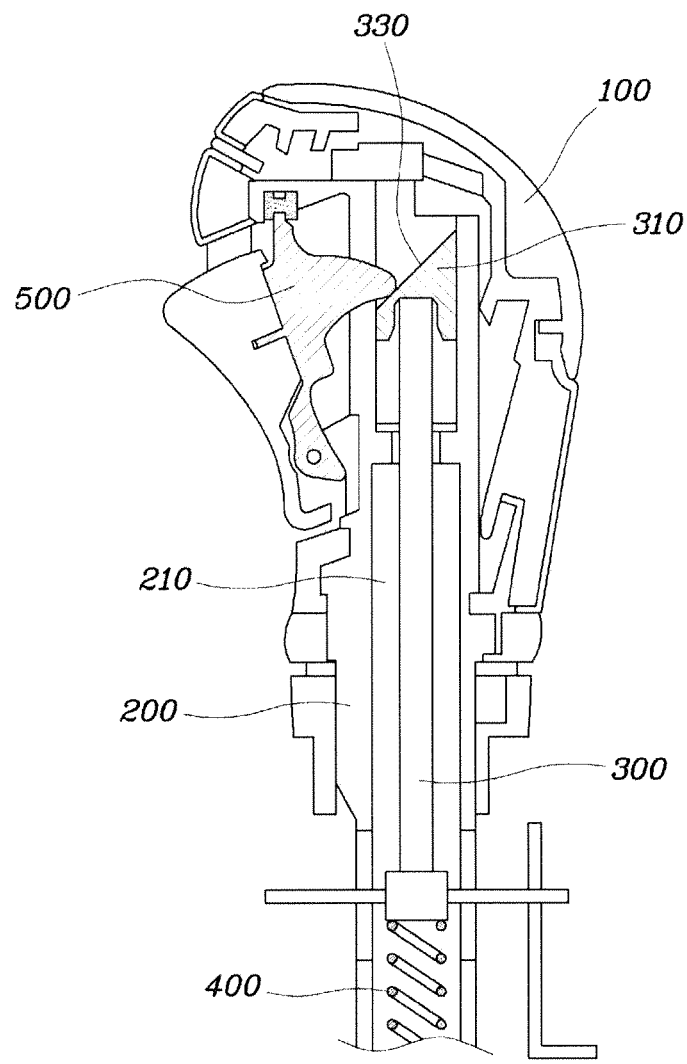
FIG. 1 is a view of a conventional shift lever.

Reference will now be made in greater detail to a preferred embodiment of the present disclosure, an example of which is illustrated in the accompanying drawings. Wherever possible, the same reference numerals will be used throughout the drawings and the description to refer to the same or like parts.

Figure 2:
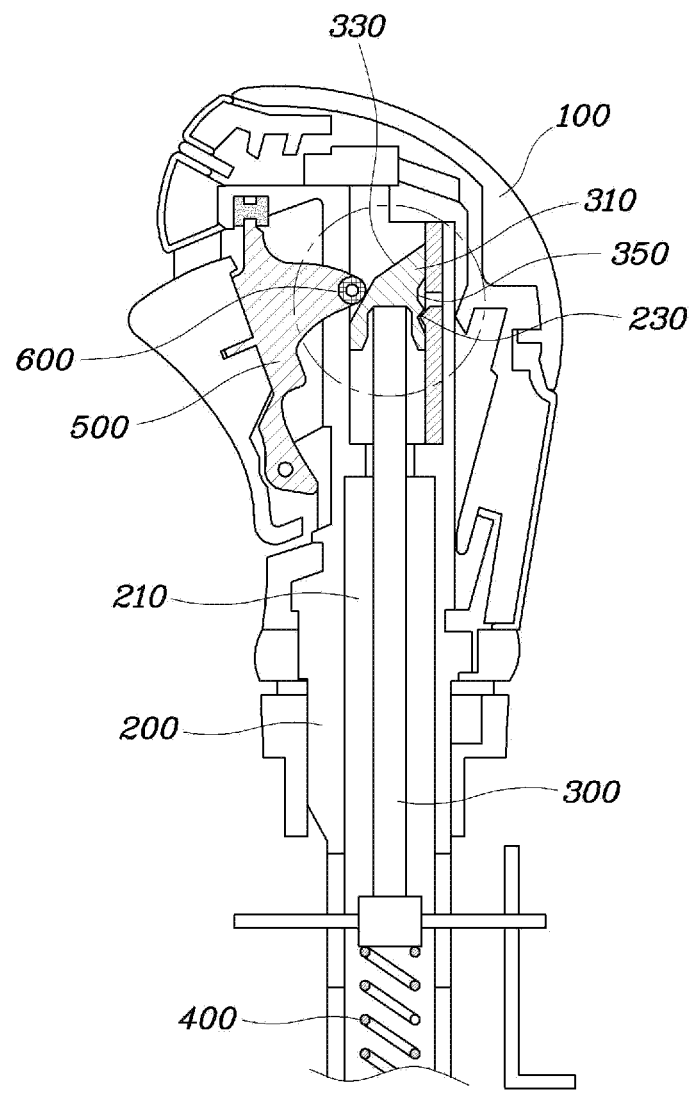
FIG. 2 is a view of a shift lever according to an embodiment of the present disclosure.

FIG. 2 is a view of a shift lever according to an embodiment of the present disclosure. The shift lever includes a support section 200, a rod 300, an engaging protrusion 230, an elastic part 400, and a button 500. The support section 200 is provided under a knob 100 and has an internal vertical mounting space 210. The rod 300 is provided in the mounting space 210 of the support section 200 to move linearly in a first direction, and has an upper part having an upper inclined surface 330 inclined at a certain angle and a side having a plurality of successive engaging grooves 350 aligned in the first direction. The engaging protrusion 230 is provided on an inner wall surrounding the mounting space 210 of the support section 200 at a position corresponding to one of the engaging grooves 350, such that, when the rod moves linearly in the first direction, the engaging protrusion is successively and selectively engaged with one of the engaging grooves so as to afford a brisk, clear operation action when changing gears. The elastic part 400 is mounted at a lower side of the rod 300 to support the rod 300 in the first direction. The button 500 is provided on one side of the knob 100 such that one end thereof extends inside the knob 100 to the inclined surface 330 of the upper part of the rod 300, and another end thereof is exposed to the outside of the knob 100 to enable that end to be pressed down so as to push down the rod 300. The button is provided on one side with a roller 600 which, when the button 500 is pressed down, pushes down the rod 300 while rolling along the inclined surface 330 of the rod 300.

In the example shown in FIG. 2, the first direction may correspond to a vertical direction with respect to gravity. However, the first direction may be any direction suitable for use in a vehicle.

In the related art, the button 500 does not have a separate configuration on its inner section and the inner section slides along the inclined surface 330, so that friction noise occurs, and when operating the button, drivers may feel stiff and rough.

Figure 3:
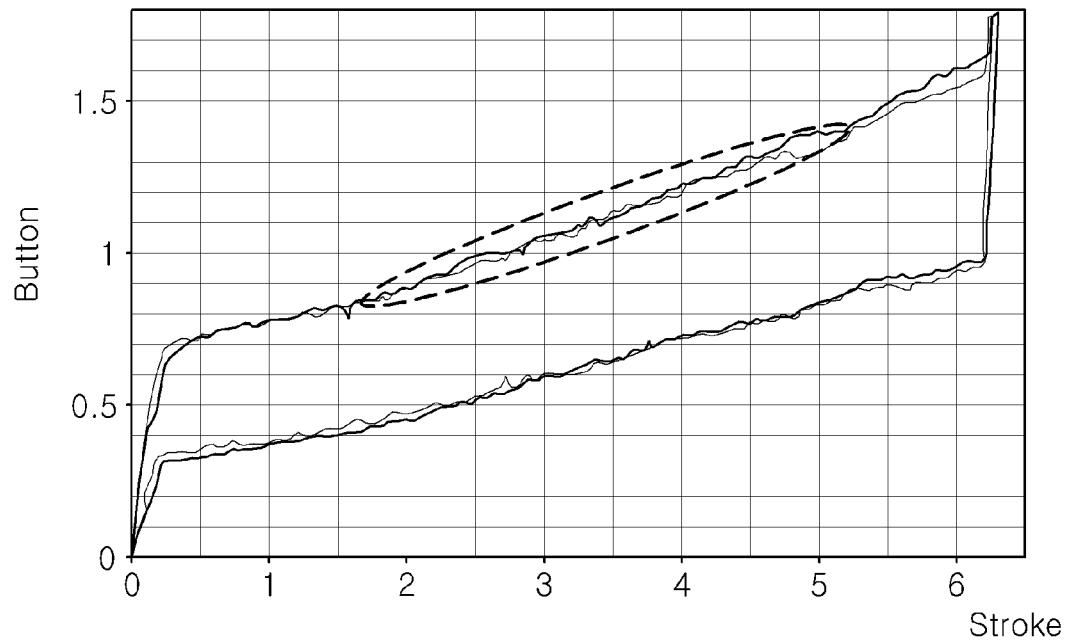
FIG. 3 is a graph showing the operation force of the conventional shift lever.
Figure 4:
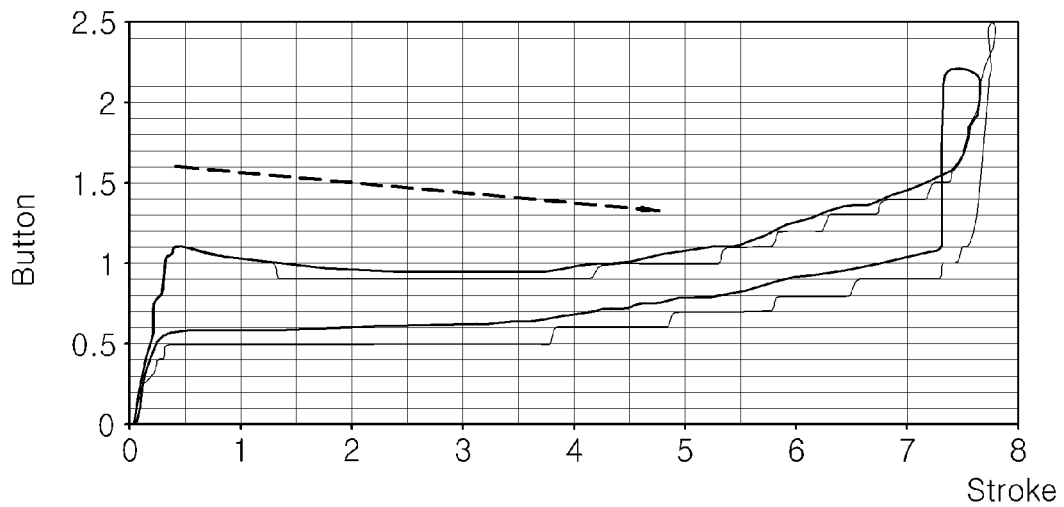
FIG. 4 is a graph showing the smoothed operation force of the shift lever according to an embodiment of the present disclosure.

FIGS. 3 and 4 are graphs showing the operation forces of the buttons of a conventional sliding type shift lever and a rolling type shift lever of the present disclosure, respectively. Here, a transverse axis indicates a stroke, and a longitudinal axis indicates the operation force of the button.

In FIG. 3, it can be seen from a dotted circle that the slope of the graph increases irregularly in the stroke of 2 to 5. This is because, when operated, a motion of the button encounters resistance due to sliding friction with the inclined surface, and a bigger force needs to be continuously applied to operate the button.

Unlike the sliding type shift lever shown in FIG. 1, the shift lever of the present disclosure is of a rolling type as shown in FIG. 2, in which a roller 600 is provided on an inner end of the button 500 exposed to the outside of the knob 100. Hence, when a driver holds the knob 100 and pushes down the button 500 to change gears, the roller rolls along the inclined surface 330 to push and move the rod 300 down, being in a state where it is possible to change gears.

As shown by the arrow in FIG. 4, unlike in FIG. 3, the operation force of the button 500 is indicated to be substantially parallel with the transverse axis. This is because the roller 600 converts the sliding motion of the button 500 to a rolling motion of the button 500, thereby smoothing the operation force.

Figure 5:
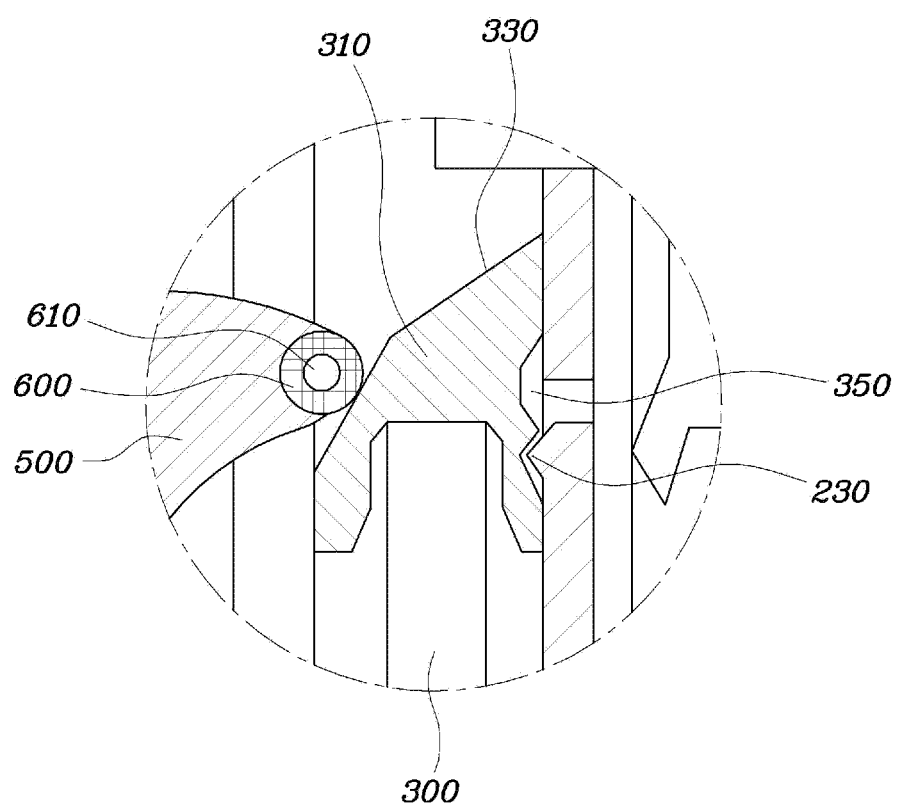
FIG. 5 is a detailed view of a circle part in FIG. 2.

FIG. 5 is a detailed view of a portion of the structure of FIG. 2 which is improved relative to the structure of FIG. 1. In FIG. 5, it can be seen that the roller 600 is provided on one end of the button 500, and the engaging protrusion 230 is formed on the inner wall of the mounting space of the support section 200 and the engaging grooves 350 are formed on the upper side of the rod 300 in the mounting space 210. The upper side of the rod 300 is provided as a separate head 310 that can be assembled to the upper portion of the rod 300. The head 310 has the inclined surface 330 on its upper portion and the engaging grooves 350 which are successively formed on its one side in the first direction, which corresponds to the linear direction that the rod moves. When a driver operates the button 500, the rod 300 is moved linearly in the first direction to enable the engaging grooves 350 to be successively engaged with the engaging protrusion 230. This affords the driver a feeling that the engagement is clearly performed whenever one of the engaging grooves is engaged with the engaging protrusion.

The inclined surface 330 of the rod 300 has a slope that is inclined at a gently variable angle. The variable angle gives a more various operation force than a fixed inclined angle in the related art.

Figure 6:
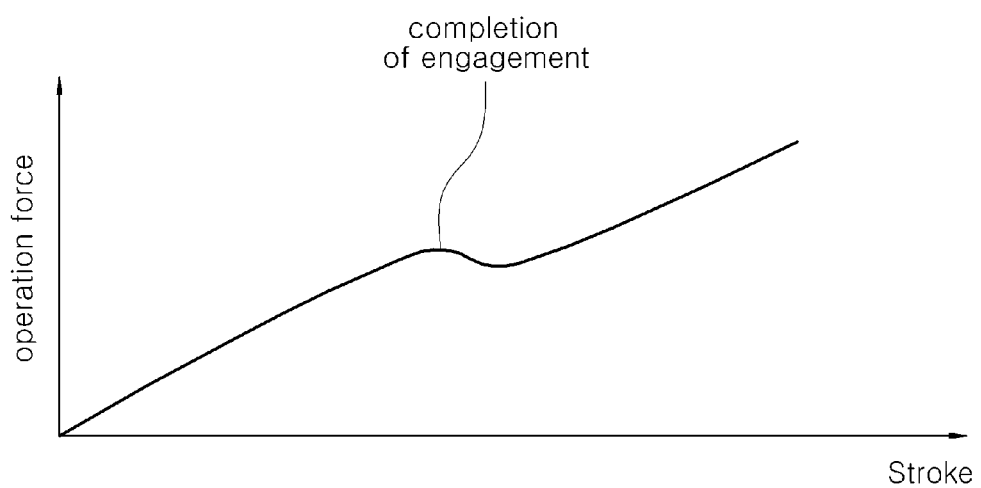
FIG. 6 is a graph showing the clear completion of the operation of the button through the operation force of the shift lever according to an embodiment of the present disclosure.

FIG. 6 is a graph showing the clear completion of the operation of the button 500 by the configuration of the engaging grooves 350 and the engaging protrusion 230, wherein a transverse axis indicates a stroke, and a longitudinal axis indicates an operation force. When the button 500 is pushed down to operate the shift lever, the roller 600 on one side of the button pushes down the rod 300 while rolling along the inclined surface 330 of the head 310, and the engaging grooves 350 of the head 310 successively come into elastic contact with and are engaged with the engaging protrusion 230 (FIG. 5). An inflection point at a middle portion of the graph indicates a time when one of the engaging grooves 350 is completely engaged with the engaging protrusion 230, so that a driver can be more clearly aware of the time when the operation of the button has been completed.

Figure 7:
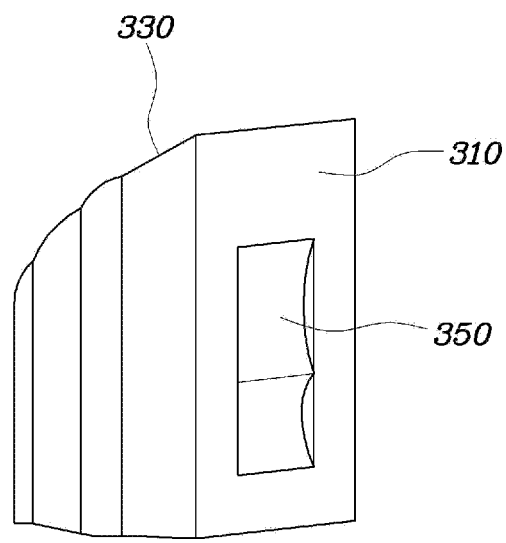
FIG. 7 is a detailed view of a head shown in FIG. 5.

FIG. 7 shows the head 310 which has the inclined surface 330 on its upper portion, and the engaging grooves 350 that are successively formed on its one side.

Figure 8:
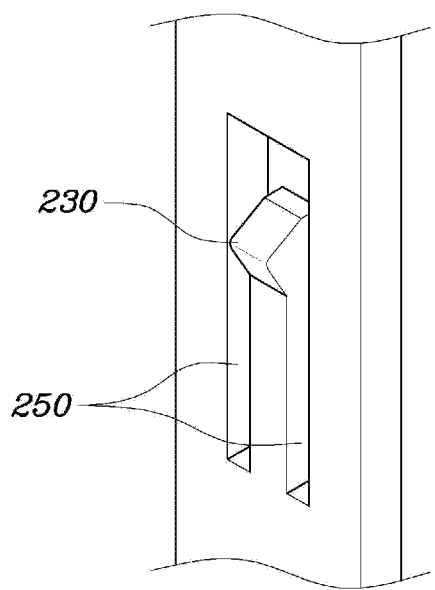
FIG. 8 is a detailed view of an engaging protrusion shown in FIG. 5.

FIG. 8 is a more detailed view of the engaging protrusion 230 which is formed on the inner wall of the mounting space 210 of the support section 200 at a position corresponding to the engaging grooves 350. The engaging protrusion 230 is provided at an upper portion of an elongate part which extends longitudinally from a base side of a rectangular opening of the inner wall of the mounting space 210. Thus, the engaging protrusion 230 is surrounded by side and upper gaps 250 in the rectangular opening such that the engaging protrusion 230 can elastically move back and forth. When the rod 300 is moved linearly, the engaging protrusion 230 closely contacts and engages with respective engaging grooves 350. Hence, when operated, the button 500 is smoothly operated such that a driver can be aware of clear and complete operation of the button 500.

Figure 9:
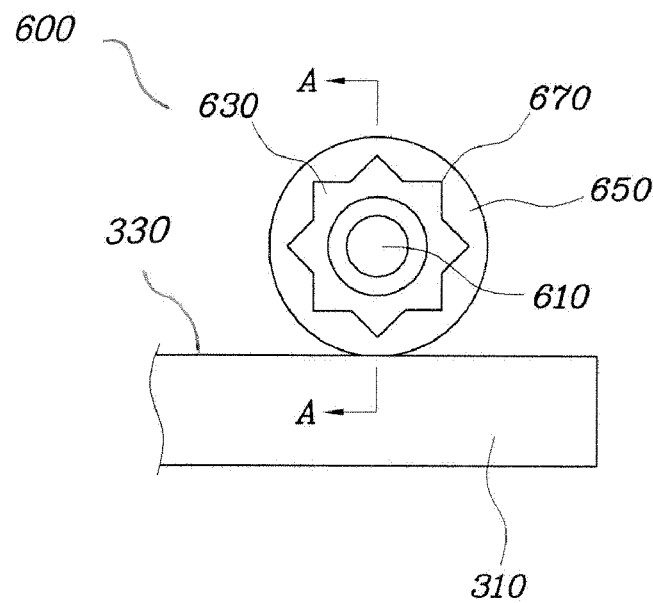
FIG. 9 is a detailed view of an axial section of a roller shown in FIG. 5.

FIG. 9 shows the roller 600 which is formed on an inner end of the button 500. The roller 600 is composed of a central shaft 610, a first member 630 made of a hard material surrounding the central shaft 610, and a second member 650 made of a soft material surrounding the first member 630.

Since the second member 650 rolls along the inclined surface 330 of the head 310, the second member 650 is made of a lower friction and softer material than the first member 630. The first member 630 is provided with circumferential protrusions 670 to engage with the second member 650 more firmly.

Figure 10:
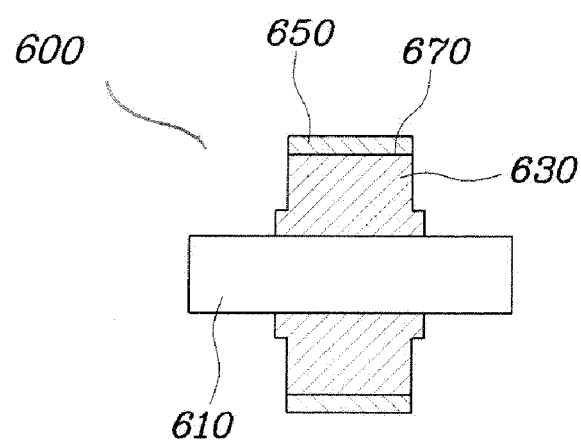
FIG. 10 is a sectional detailed view taken along line A-A of FIG. 9.

FIG. 10 is a sectional detailed view taken along line A-A of FIG. 9, showing the side of the roller 600. A gap is provided between the central shaft 610 and the first member 630. The gap allows the roller 600 to roll along the inclined surface 330 without being fixed.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A shift lever for a vehicle transmission, comprising:
    a knob;
    a support section provided under the knob and having an internal mounting space aligned in a first direction;
    a rod provided in the mounting space of the support section and configured to move linearly in the first direction, and having an upper part having an upper inclined surface inclined at a certain angle with respect to the first direction, and a side having a plurality of successive engaging grooves aligned in the first direction;
    an engaging protrusion provided on an inner wall surrounding the mounting space of the support section at a position corresponding to one of the engaging grooves such that, when the rod moves linearly in the first direction, the engaging protrusion is configured to successively and selectively engage with one of the engaging grooves so as to afford a brisk, clear operation action when changing gears;
    an elastic part mounted at a lower side of the rod to support the rod in the first direction; and
    a button provided on one side of the knob such that one end thereof extends inside the knob to the inclined surface of the upper part of the rod, and another end thereof is exposed to the outside of the knob to enable that end to be pressed down so as to push the rod down.

2. The shift lever for a vehicle transmission according to claim 1, wherein the button is provided on one side with a roller which, when the button is pressed down, the button is configured to push down the rod while rolling along the inclined surface of the rod.

3. The shift lever for a vehicle transmission according to claim 1, wherein the button is provided on one side with a roller comprising a central shaft, a first member of a hard material surrounding the central shaft, and a second member of a soft material surrounding the first member.

4. The shift lever for a vehicle transmission according to claim 3, wherein the first member has a circumferential protrusion configured to increase an engaging force with respect to the second member.

5. The shift lever for a vehicle transmission according to claim 1, wherein the engaging protrusion is provided in an opening of the inner wall of the mounting space of the support section and is surrounded by side and upper gaps in the opening, such that the engaging protrusion is configured to elastically move back and forth.

6. The shift lever for a vehicle transmission according to claim 1, wherein the rod comprises a head which is assembled onto the upper part of the rod, wherein the head has an inclined surface which includes the upper inclined surface on an upper portion of the head, and wherein the head includes the plurality of successive engaging grooves aligned in the first direction on a side of the upper part.

7. The shift lever for a vehicle transmission according to claim 1, wherein the inclined surface has a slope inclined at a gently variable angle with respect to the first direction.

* * * * *